(12) United States Patent
Friedrich et al.

(10) Patent No.: US 11,105,372 B2
(45) Date of Patent: Aug. 31, 2021

(54) BEARING CAGE SEGMENT INCLUDING WELDING-MATERIAL BODIES OR LOCATIONS

(71) Applicant: AKTIEBOLAGET SKF, Gothenburg (SE)

(72) Inventors: Hans-Juergen Friedrich, Königsberg-Römershofen (DE); Norbert Huhn, Schweinfurt (DE); Thomas Kettner, Bamberg (DE); Manfred Mattes, Kolbingen (DE); Harald Metz, Randersacker (DE); Achim Mueller, Dittelbrunn (DE); Alfred Radina, Poppenlauer (DE); Jonas Schierling, Hassfurt (DE); Maximilian Soellner, Bundorf (DE); Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/780,075

(22) Filed: Feb. 3, 2020

(65) Prior Publication Data

US 2020/0256391 A1    Aug. 13, 2020

(30) Foreign Application Priority Data

Feb. 7, 2019   (DE) .............................. 102019201554

(51) Int. Cl.
*F16C 33/54*    (2006.01)
*F16C 33/46*    (2006.01)
(Continued)

(52) U.S. Cl.
CPC ............ *F16C 33/543* (2013.01); *B21D 53/12* (2013.01); *B23K 26/21* (2015.10); *B23P 15/003* (2013.01);
(Continued)

(58) Field of Classification Search
CPC ...... F16C 19/24; F16C 33/541; F16C 33/543; F16C 33/545; F16C 2223/46;
(Continued)

(56) References Cited

U.S. PATENT DOCUMENTS 2,269,224 A * 1/1942 Reilly .................. B23K 33/004
219/137 R
2,591,160 A * 4/1952 Kilian .................... B21D 53/12
384/575
(Continued)

FOREIGN PATENT DOCUMENTS

CN        103415717 A  * 11/2013  ............ F16C 33/545
CN        104475350 A  *  4/2015  ............... B07C 5/35
(Continued)

*Primary Examiner* — Marcus Charles
(74) *Attorney, Agent, or Firm* — J-Tek Law PLLC; Scott T. Wakeman; Mark A. Ussai

(57) ABSTRACT

A sheet metal bearing cage segment includes a first ring section, at least one second ring section, and a plurality of bridges connecting the first and second ring sections to each other and defining a plurality of pockets between the bridges. The bearing cage segment includes first and second circumferentially directed joint edges, the first joint edge is configured to connect to the second joint edge of the bearing cage segment or to a second joint edge of another sheet metal bearing cage segment, and the first joint edge includes at least one body of welding material projecting from the joint edge. The body of welding material may be pressed against the second joint edge while leaving a gap between (Continued)

the joint edges, and the welding material can be liquified by a resistance welding process to connect the joint edges.

18 Claims, 1 Drawing Sheet

(51) Int. Cl.
    *B23K 26/21*     (2014.01)
    *B23P 15/00*     (2006.01)
    *C21D 9/50*     (2006.01)
    *B21D 53/12*     (2006.01)

(52) U.S. Cl.
    CPC ............ *C21D 9/50* (2013.01); *F16C 33/4694* (2013.01); *F16C 33/541* (2013.01); *F16C 2223/46* (2013.01); *F16C 2226/36* (2013.01); *Y10T 29/49691* (2015.01); *Y10T 29/49968* (2015.01)

(58) Field of Classification Search
    CPC ..... F16C 2226/36; B23K 26/21; B21D 53/12; B21D 53/18; C21D 9/40; C21D 9/50; B23P 15/003; Y10T 29/49689; Y10T 29/49968; Y10T 29/49691
    USPC ....... 384/523, 561, 564, 572, 575, 579, 585; 228/50, 155; 219/136; 29/898.066, 413, 29/898.067
    See application file for complete search history.

(56) References Cited

U.S. PATENT DOCUMENTS

| | | | | |
|---|---|---|---|---|
| 3,313,582 A | * | 4/1967 | Hubbell | F16C 33/427 |
| | | | | 384/530 |
| 3,353,246 A | * | 11/1967 | Farmer | B21D 53/12 |
| | | | | 29/898.067 |
| 3,356,428 A | * | 12/1967 | Altson | F16C 33/543 |
| | | | | 384/575 |
| 3,473,857 A | * | 10/1969 | Pitner | F16C 19/46 |
| | | | | 384/572 |
| 4,577,088 A | * | 3/1986 | Sharp | B23K 26/262 |
| | | | | 219/121.63 |
| 4,821,386 A | * | 4/1989 | Simon | B23D 31/003 |
| | | | | 29/898.066 |
| 5,187,345 A | * | 2/1993 | Alling | F16C 33/427 |
| | | | | 219/121.63 |
| 5,528,706 A | * | 6/1996 | Harimoto | B21D 53/12 |
| | | | | 384/573 |
| 6,330,748 B1 | * | 12/2001 | Muntnich | B21D 53/12 |
| | | | | 29/898.067 |
| 8,770,854 B2 | * | 7/2014 | Friedrich | F16C 33/66 |
| | | | | 384/579 |
| 9,382,947 B2 | * | 7/2016 | Ishibashi | F16C 33/4694 |
| 9,551,377 B2 | * | 1/2017 | Haas | F16C 9/04 |

FOREIGN PATENT DOCUMENTS

| | | | | |
|---|---|---|---|---|
| CN | 104847794 A | * | 8/2015 | ............. F16C 33/46 |
| CN | 104847795 A | * | 8/2015 | ............. F16C 33/00 |
| DE | 3130610 A | * | 2/1983 | ............. B21D 53/12 |
| DE | 19910928 A1 | * | 9/2000 | ......... B23K 15/0086 |
| EP | 0074803 A1 | * | 3/1983 | ............. C23C 4/00 |
| FR | 2612102 A1 | * | 9/1988 | ............. B23K 9/092 |
| GB | 2103307 A | * | 2/1983 | ............ F16C 33/545 |
| JP | 4786124 B2 | * | 10/2011 | ............. B23K 26/00 |
| JP | 2013007435 A | * | 1/2013 | ............ F16C 33/545 |
| JP | 2013108587 A | * | 6/2013 | ............ F16C 33/545 |
| JP | 2017026083 A | * | 2/2017 | ............. F16C 33/54 |
| JP | 6197844 B2 | * | 9/2017 | ............. F16C 33/54 |
| WO | WO-2014136816 A1 | * | 9/2014 | ........ F16C 33/4611 |
| WO | WO-2015022355 A1 | * | 2/2015 | ............ F16C 19/364 |
| WO | WO-2018109784 A1 | * | 6/2018 | ............. F16C 19/48 |

* cited by examiner

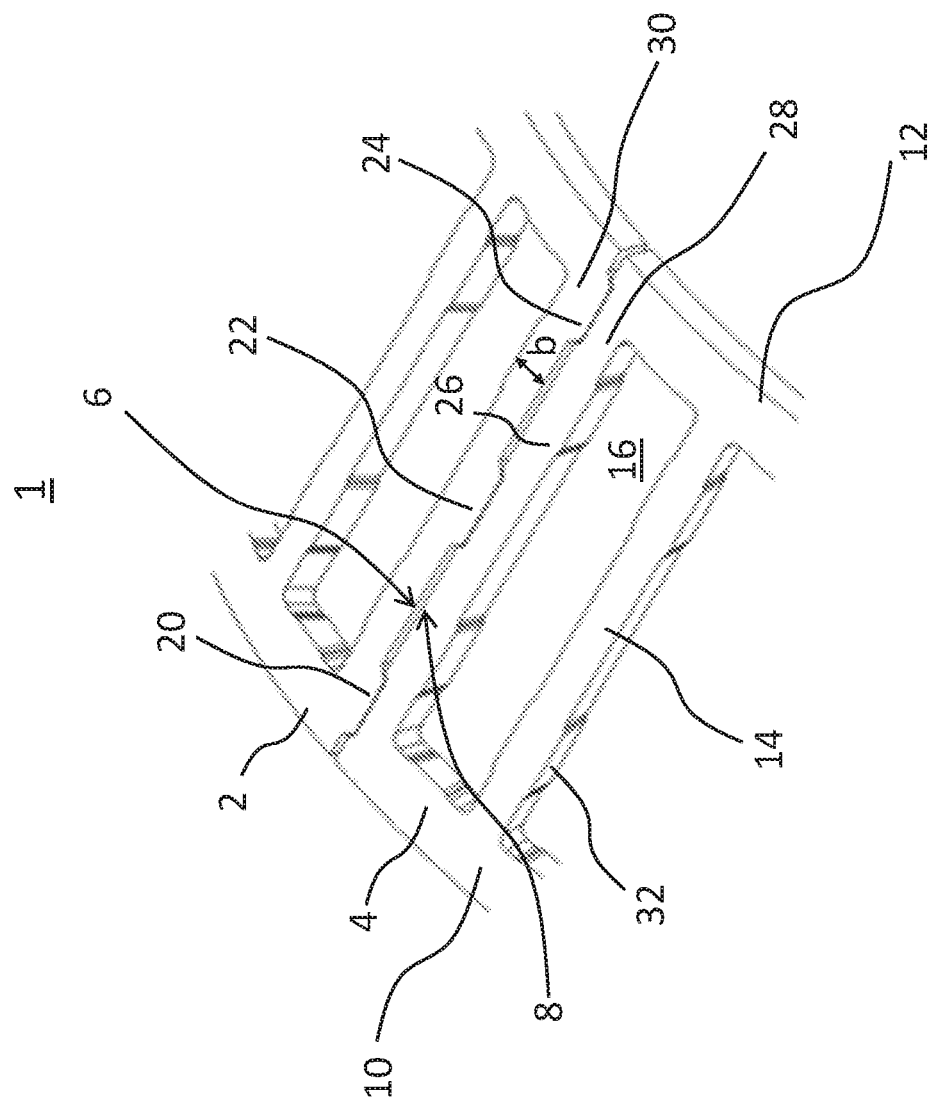

BEARING CAGE SEGMENT INCLUDING WELDING-MATERIAL BODIES OR LOCATIONS

CROSS-REFERENCE

This application claims priority to German patent application no. 10 2019 201 554.9 filed on Feb. 7, 2019, the contents of which are fully incorporated herein by reference.

TECHNOLOGICAL FIELD

The present disclosure is directed to a bearing cage segment of a sheet metal cage and a sheet metal cage including such a bearing cage segment.

BACKGROUND

Bearing cages are known from the prior art that are composed of one or more rounded cage segments, made of metal plate, that are respectively connected to one another at their joint edges, for example by welding.

Here it is known to produce the structure and contour of such bearing cage segments by punching and stamping. For this purpose in a first step a metal band is intermittently moved along in the longitudinal direction, wherein transversely extending slots are formed by a punch press. In a further step the metal band is cut to length using a transverse cutting device so that a ladder-type-shaped sheet metal part is formed, wherein the "rungs" of this part form bridges of the bearing cage segment, the slots of the part form pockets of the bearing cage segment, and the "side rails" of the part form the ring sections of the bearing cage segment. In a subsequent step the ring sections are then bent to the desired radius of curvature by round molds.

Cutting to length is usually effected here in the region of a pocket so that a joint edge is formed on each of the ring sections and a "partial pocket" is formed therebetween. When assembling the bearing cage segment into the final cage, these joint edges are welded together with two further, analogously formed joint edges so that a "welded pocket" is formed by the connection of the "partial pockets."

"Cutting to length" is a punching process wherein a combined shear-cutting and breaking occurs. For this reason the joint edges of the ring sections, which joint edges are formed by the cutting-to-length of the metal plate and are directed in the circumferential direction, are not dimensionally stable enough to be able to serve directly as a welding surface. A post-processing is therefore usually required here. In addition, a cutting liquid is typically used during the cutting-to-length which must still be removed afterwards.

The post-processing here is necessarily associated with a material removal. Therefore if after the bearing cage segment has been bent round the post-processed joint edges were to simply be welded to the corresponding joint edges opposing in the circumferential direction, then at this connecting location a welding pocket would be formed which, viewed in the circumferential direction, would have a different width than the other pockets. For this reason, according to the prior art, after cutting to size the ring sections are first shortened by approximately a complete pocket width and only then post-processed, so that with respect to the desired pocket width they have the correct length for connecting to the opposing joint edges. The final pocket is lost in this way as waste. Accordingly, in addition to the additional effort of the post-processing, significant material loss also occurs here.

In addition, in the prior art described here the welded joint also represents the weakest location of the finished cage. If such a cage breaks in operation, for example, due to the occurring centrifugal forces, breaking usually occurs at the location of the welded joint. The quality of the welded joint is thus of particular significance since the performance of the finished bearing cage significantly depends thereon.

SUMMARY

It is therefore an aspect of the present disclosure to present a bearing cage segment that is particularly suitable for producing a reliable connection for forming a bearing cage.

In the following a bearing cage segment of a sheet metal cage, in particular for a needle roller bearing, is provided, which includes a first ring section, at least one second ring section, and a plurality of bridges connecting the first ring section and the at least one second ring section to each other, wherein a pocket for receiving at least one rolling element is respectively formed between the bridges. The bearing cage segment includes at least one first joint edge directed in the circumferential direction, which joint edge is configured to be connected to a second joint edge. As further preferred exemplary embodiments show, the second joint edge here can be disposed either on the same bearing cage segment or a second further bearing cage segment. The bearing cage segment can be configured for a single-row or multi-row bearing cage.

In order to achieve a reliable connection between the joint edges, furthermore at least one location is provided on the first and/or second joint edge, at which location a welding material is disposed for a welding process. This welding material serves to liquefy during welding and to form a weld seam so that the joint edges themselves do not need to be involved in the welding process. The dimensional stability and the welded joint can thereby be improved. Here the welding material location is in particular a contact surface specifically reduced and adapted for a welding process. Preferably, the welding material location includes an identifiable body of the welding material that projects from the first and/or second joint edge in the form of a point, project, tab, bump or similar structure. When the welding material body or bodies of one joint edge is/are pressed against the second joint edge and/or the welding material body or bodies on the second edge, a gap exists between the joint edges themselves which gap is filled by the liquified welding material bodies. Reference herein to "welding material locations" also refers to the portion of material at those locations that is intended to liquify during the welding process.

This is advantageous in particular when resistance welding is used, wherein the connection partners, in this case the bearing cage segments, or the joint edges of the bearing cage segment, are usually heated until the welding temperature is reached, and then the joint edges are welded under force by the solidification of the melt, by diffusion, or also in solid phase. However, this regularly leads to an impairment of the dimensional stability of the bearing cage, since the joint edges themselves are involved in the welding process. In contrast, due to the proposed locations including welding material, the resistance that the welding material locations have to the current is specifically settable or definable, in particular it can be increased, so that the welding material is already liquefied at low current load and can serve to weld the joint edges to each other.

In general, all variants of resistance welding use the heat generated by a local current flow in the parts to be connected for the welding process, wherein the heat applied to the workpiece can be calculated by the following formula:

$$W_s = I_s^2 R_s t_s.$$

wherein $W_s$ is the welding energy, $I_s$ the welding current, $R_s$ is the resistance at the welding location, and $t_s$ is the welding time.

Here the resistance $R_s$ is dependent on the material, the amount, and the extension of the material.

Thus it is advantageous in particular if the shape and/or the amount and/or the material of the welding material is adapted to the welding process to be expected.

If the specific resistance of the welding material locations is known, then, for example, the current supply and thus the heat development can be adapted such that only the welding material is liquefied, but the bearing cage segments or the joint edges do not experience any structural transformation. The dimensional stability of the bearing cage can thereby be maintained, and the resistance welding process can be automatically terminated as soon as the welding material is liquefied.

It is therefore particularly preferred if the shape and/or length and/or the material of the welding material is adapted to the current flow to be expected of an electrical resistance welding process.

According to a further preferred exemplary embodiment, the welding material is comprised of the same material as the bearing cage segment, wherein the welding material and the bearing cage segment are preferably integrally formed. However, alternatively or additionally it is also possible that the welding material and the bearing cage segment are manufactured from different materials at least at one location. On the one hand the welding joint or welding seam can thereby be influenced via the choice of the material, while on the other hand, with an identical formation the welding material can be manufactured in the same manufacturing process as the bearing cage segment itself.

As already mentioned above, the joint edge can be disposed both in the region of a to-be-formed bridge or in the region of a to-be-formed pocket. Since the joint edges themselves cannot be influenced by the welding process, precisely dimensioned to-be-formed pockets or to-be-formed bridges are shaped.

Here it is particularly advantageous to arrange the joint edge in the region of the to-be-formed bridge. In this way sufficient space is provided for forming the welding material location(s) at the joint edge. In addition, an overall enlarged connecting surface can be achieved on the bridge surface, whereby the stability of the connection can be increased.

The pockets can subsequently be configured with larger axial extension so that longer rolling elements, that is, for example, longer needles, can be used. In this way the load capacity of a correspondingly formed bearing can be increased so that the bearing is suitable for supporting higher bearing forces. In addition—viewed perpendicular to the circumferential direction—the bearing cage can be configured thinner overall, whereby a corresponding material saving can be achieved.

Furthermore, no end-side partial pocket is formed in the region of the to-be-formed bridge by the design of the joint edge, so that the material loss of the "final pocket" given in the above-mentioned prior art can already be avoided.

Here it is furthermore advantageous if for the width b, measured in the circumferential direction, of a partial bridge for forming of the to-be-formed bridge it holds that: 0.5 d≤b≤d, wherein d is the width of the bridges measured in the circumferential direction. Due to this choice it can be achieved that with low material use the to-be-formed bridge exhibits sufficient stability for the welding connection.

A further advantage of the arrangement of the joint edge in the region of the bridge lies in that due to the welding material, advantageously no additional mechanical control is required in order to end the resistance welding at the correct time. This is effected automatically when the small welding material locations are melted and the contacting cross-section is extended with welding material from the small locations to the entire region of the joint edge. Since this effect is particularly large with joint edges that extend over the entire width of the cage, that is, are disposed in the region of the bridge, as mentioned above the arrangement on the bridge is particularly preferred.

According to a further preferred exemplary embodiment, at least one of the welding material locations is configured as an aligning element that makes possible a radial, axial, and/or circumferential orientation of the first joint edge against the second joint edge. For this purpose, for example, two welding material locations can be provided complementary to each other, and interact with each other in order to align the joint edges axially, radially, and/or circumferentially against each other.

According to a further exemplary embodiment, in an integral design of welding material location and bearing cage segment, the at least one welding material location and/or the at least one joint edge is formed by laser cutting. The joint edge and/or the welding material location can be precisely manufactured by laser cutting. In addition it can thus be achieved that the joint edge is directly suitable as welding edge. In this way a post-processing is not required for a reliable welding connection. In addition, due to the laser cutting the bearing cage segment can be individually manufactured, for example, by a cutting-out from a metal plate. In this way the material loss as it occurs in the prior art can also be avoided.

According to a further preferred exemplary embodiment, at least one of the pockets is punched. The pockets can thereby be manufactured particularly suitably since a punching is a simple and rapid manufacturing process.

According to a further exemplary embodiment, the joint edge includes a chamfer on the radially outer side and/or the radially inner side. Due to this design it is made possible that during the producing of the welding connection no region forms projecting radially or axially over the respective ring section, in particular no projecting weld seam (so-called upper bead). A particularly simple manufacturing of the chamfer is made possible when it is formed by a reshaping process, i.e., for example, by a rolling or a milling.

According to a further aspect of the disclosure a sheet metal cage is provided, in particular for a needle roller bearing, that includes at least one above-described bearing cage segment. Here the at least one bearing cage segment or the plurality of bearing cage segments are welded at their joint edges via electrical resistance welding. The sheet metal cage can be configured single-row or multi-row.

A further aspect of the present disclosure relates to a method for manufacturing a sheet metal cage wherein the at least one bearing cage segment or the plurality of bearing cage segments are connected to each other at their joint edges by an electrical resistance welding, wherein an application of current to the bearing cage segments is based on the shape and/or the amount and/or the material of the welding material.

Here an exemplary embodiment is advantageous in particular wherein the application of current during the electrical resistance welding is set such that only a liquefaction of the welding material is achieved during the application of the corresponding current, and/or the welding process is terminated as soon as the entire surface of the joint edge reduces the resistance of the material.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 is a schematic perspective detail view of a preferred exemplary embodiment of a sheet metal cage.

DETAILED DESCRIPTION

In the following, identical or functionally equivalent elements are designated by the same reference numbers. The direction designations used in the following—axial, radial, circumferential—always refer to the finished bearing cage.

FIG. 1 shows a detail view of a first exemplary embodiment of a sheet metal cage including a first bearing cage segment 2 and a second bearing cage segment 4, which are respectively disposed abutting against each other at a joint edge 6, 8. Here instead of the first bearing cage segment 2 and the second bearing cage segment 4, also only a single bearing cage segment 2 can be provided that includes the joint edge 6 at a first end and the joint edge 8 at a second end.

For the sake of simplicity it is assumed here in the following that the metal cage 1 includes at least two bearing cage segments 2, 4 that abut against each other.

Each bearing cage segment 2, 4 includes a first ring section 10 and a second ring section 12, and a plurality of bridges 14 connecting the first ring section 10 and the second ring section 12 to each other. Of course, instead of the bearing cage 1 depicted single-row here, the bearing cage 1 can be configured multi-row, and include more than two ring sections that are each connected to one another via bridges.

A pocket 16 for receiving at least one rolling element (not depicted) is respectively formed between the bridges 14. In the example shown the sheet metal cage is a needle-bearing cage, and the pockets 16 are each configured for receiving a needle-shaped rolling element.

FIG. 1 furthermore shows the bearing cage segments 2, 4 in their not-connected state, that is, before they are connected to each other at their respective joint edges 6, 8 via a weld connection. Here electrical resistance welding is suitable in particular for producing the connection.

During resistance welding the components to be connected, in this case the bearing cage segments 2, 4, are acted on by a certain current flow such that they fuse together in the region of their joint edges. Relatively high energy is needed for this purpose, and the dimensional stability of the bearing ring 1 is reduced since the material of the joint edges itself is liquefied and they are pressed against each other by pressure.

In order to achieve a defined connection during resistance welding, at least one, preferably a plurality of, welding material locations 20, 22, 24, are provided on at least one of the joint edges 6, 8 of the bearing cage segments 2, 4; the welding material locations 20, 22, 24 are liquefied due to the heat developed during application of a current to the bearing cage segments 2; 4, and thus a connection between the bearing cage segments 2,4 can occur.

It is to be mentioned here in particular that the amount and/or selection of the welding material or the shape of the welding material locations 20, 22, 24 are adapted such that only the welding material, but not the joint edges 6, 8, are liquefied. A very good dimensional stability can thereby be achieved during welding, and it can simultaneously be achieved that the resistance welding process automatically stops as soon as the welding material locations are depleted, since the current flow is distributed over the entire joint edge and no longer concentrated at the welding material locations.

A very precise, rapid, simple, and error-forgiving welding of the bearing cage segments 2, 4 can thereby be achieved.

In principle the welding material locations or the joint edges can be provided at any location in the bearing cage. However, where the joint edges are provided in the region of the to-be-formed bridge, as depicted in FIG. 1, the difference between current demand for welding the sacrificial locations 20, 22, 24 and the joint edges 6, 8 is so large that a random liquefaction of the joint edges does not also occur. The dimensional stability of the bearing cage can thereby be increased, and an automatic ending of the welding process can thereby be achieved.

In order to achieve an exact orientation of the joint edges 6, 8 or of the bearing cage segments 2, 4 with respect to each other, the welding material locations 20, 22, 24 can furthermore be configured as alignment elements that are preferably configured complementary to each other. Due to this design a moving or displacing of the bearing cage segments is restricted, so that it is ensured that the orientation of the bearing cage segments 2, 4 is maintained even during the producing of the weld connection.

As furthermore depicted in FIG. 1, the joint edges 6, 8 are disposed in the region of a bridge 26 to be formed by this connection. Accordingly the first bearing cage segment 2 includes a first "partial bridge" 28 and the second bearing cage segment 4 includes a second "partial bridge" 30, wherein due to the connection of the corresponding joint edges 6, 8 these partial bridges 28, 30 form the to-be-formed bridge 26. Since the joint edges 6, 8 are formed in the region of the bridge 26, a particularly large contact or connecting surface can be achieved, and subsequently a particularly stable and reliable connection can be achieved. Here the partial bridges 28, 30 respectively have a width b, measured in the circumferential direction, for which the following applies: $0.5\ d \leq b \leq d$, wherein d is the width of the "normal" bridges 14. In addition, it can thereby be reliably achieved that the welding process automatically ends, since the resistance of the "long" joint edge is significantly lower than that of the "short" welding material locations, so that the heat energy provided by the constant welding current no longer suffices to liquefy the joint edges.

The joint edges 6, 8 and/or the welding material locations are preferably formed by laser cutting. In this way the joint edges 6, 8 and/or the welding material locations can be so precisely shaped that a post-processing for a suitability as a welding surface is no longer required, or the provided resistance is uniquely defined. In addition, the surface of the joint edges 6, 8 is directly cleaned by the laser cutting process. However, the pockets 16 can also be formed by a punching.

As can furthermore be seen from FIG. 1, guide surfaces 32 for guiding the rolling elements can also be formed on the bridges 14, also on the welding bridge 26, and on the ring sections 2, 4. These guide surfaces 32 can be formed, for example, during the punching of the pockets 16.

Overall by providing special welding material locations, no additional mechanical control is required in order to terminate the resistance welding at the correct time. This is effected automatically when the small welding material locations are melted and the contacting cross-section is extended with welding material from the small locations to the entire region of the joint edge. Since this effect is particularly large with joint edges that extend over the entire width of the cage, that is, are disposed in the region of the bridge, as mentioned above the arrangement on the bridge is particularly preferred. In addition, the dimensional stability of the cage can be significantly improved overall since the joint edges can be precisely manufactured, and only the sacrificial locations are subjected to the actual welding process. In addition, the size of the weld seam can be precisely calculated by the amount of the welding material present.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cage segments and methods for welding bearing cage segments.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Sheet metal cage
2 First bearing cage segment
4 Second bearing cage segment
6, 8 Joint edges
10 First ring section
12 Second ring section
14 Bridge
16 Pockets
22, 24 Seal material location
26 To-be-formed bridge
28, 30 Partial bridge
32 Guide surface

What is claimed is:

1. A bearing cage segment of a sheet metal cage, the bearing cage segment comprising:
a first sheet metal ring section,
at least one second sheet metal ring section, and
a plurality of sheet metal bridges connecting the first ring section and the at least one second ring section to each other,
a pocket between adjacent pairs of the plurality of bridges configured to receive at least one rolling element,
wherein the bearing cage segment includes a first joint edge directed in a first circumferential direction and a second joint edge directed in a second circumferential direction, the first joint edge being configured to connect to the second joint edge of the bearing cage segment or to a second joint edge of another sheet metal bearing cage segment, and
wherein the first joint edge includes at least one body of welding material projecting from the joint edge and pressed against the second joint edge prior to welding.

2. The bearing cage segment according to claim 1, wherein the bearing cage segment is curved such that the at least one body of welding material contacts the second joint edge while leaving a circumferential gap between the first joint edge and the second joint edge.

3. The bearing cage segment according to claim 2, wherein the at least one body of welding material comprises the sheet metal.

4. A method for manufacturing a sheet metal cage comprising:
providing the sheet metal cage according to claim 3; and
performing an electrical resistance welding operation to liquify the at least one body of welding material while pressing the first joint edge and second joint edge together.

5. The bearing cage segment according to claim 2, wherein the second joint edge includes a recess configured to receive a portion of the at least one body of welding material such that the gap between the first joint edge and the second joint edge is present when the at least one body is pressed against a bottom of the recess.

6. A method for manufacturing a sheet metal cage comprising:
providing the sheet metal cage according to claim 2; and
performing an electrical resistance welding operation to liquify the at least one body of welding material while pressing the first joint edge and second joint edge together.

7. The bearing cage segment according to claim 1, wherein a shape and/or an amount and/or a material of the body of welding material is adapted to the welding process to be expected.

8. The bearing cage segment according to claim 1, wherein a shape and/or an amount and/or a material of the welding material is adapted to a current flow to be expected of an electrical resistance welding process.

9. The bearing cage segment according to claim 1, wherein the body of welding material comprises a same material as the bearing cage segment.

10. The bearing cage segment according to claim 1, wherein the bearing cage and the body of welding material are integrally formed.

11. The bearing cage segment according to claim 1, wherein the body of welding material and the bearing cage segment are formed from different materials.

12. The bearing cage segment according to claim 1, wherein at least one joint edge is disposed in the region of a to-be-formed bridge.

13. The bearing cage segment according to claim 1, wherein the at least one body of welding material is configured to align the first joint edge radially, axially, and/or circumferentially relative to the second joint edge.

14. A sheet metal cage comprising at least one bearing cage segment according to claim 1, wherein the at least one bearing cage segment are connected at their joint edges via electrical resistance welding.

15. A method for manufacturing a sheet metal cage comprising:
providing a first and a second sheet metal cage segment according to claim 1;
placing the at least one body of welding material of the first joint edge of the first cage segment against the second joint edge of the second cage segment; and
performing an electrical resistance welding operation to liquify the at least one body of welding material while pressing the first joint edge and second joint edge together.

16. A bearing cage segment according to claim 1, wherein the at least one body of welding material projecting from the first joint edge includes at least two axially spaced bodies of welding material each projecting from the first joint edge.

17. A bearing cage segment according to claim 16, wherein a gap is defined between the at least two axially spaced bodies of welding material prior to welding, the gap being at least partially filled with the liquified welding material bodies during welding.

18. A bearing cage segment of a sheet metal cage, the bearing cage segment comprising:
a first sheet metal ring section,
at least one second sheet metal ring section, and
a plurality of sheet metal bridges connecting the first ring section and the at least one second ring section to each other,
a pocket between adjacent pairs of the plurality of bridges configured to receive at least one rolling element,
wherein the bearing cage segment includes a first joint edge directed in a first circumferential direction and a second joint edge directed in a second circumferential direction, the first joint edge being configured to connect to the second joint edge of the bearing cage segment or to a second joint edge of another sheet metal bearing cage segment,
wherein the first joint edge includes at least one body of welding material projecting from the joint edge,
wherein the bearing cage segment is curved such that the at least one body of welding material contacts the second joint edge while leaving a circumferential gap between the first joint edge and the second joint edge and the second joint edge includes a recess configured to receive a portion of the at least one body of welding material such that the gap between the first joint edge and the second joint edge is present when the at least one body is pressed against a bottom of the recess.

* * * * *